United States Patent
Decker et al.

[11] 3,869,301
[45] Mar. 4, 1975

[54] HOLOGRAPHIC RECORDING MATERIAL FOR INFRARED RADIATION

[75] Inventors: Gernot Decker, Garching; Hans Herold, Oberschleissheim; Horst Röhr, Garching, all of Germany

[73] Assignee: Max-Planck-Gesellschaft zur Forderung der Wissenschafton e.V., Gottingen, Germany

[22] Filed: June 11, 1973

[21] Appl. No.: 368,987

[30] Foreign Application Priority Data
June 16, 1972 Germany............................ 2229476

[52] U.S. Cl..................... 117/36.1, 96/27 H, 96/47, 350/3.5
[51] Int. Cl. .............................................. B41c 1/06
[58] Field of Search ............. 117/36.1; 96/27 H, 47;

[56] References Cited
UNITED STATES PATENTS
3,588,439  6/1971  Heller et al. .......................... 350/3.5
3,775,111  11/1973  Norman .............................. 96/27 H Primary Examiner—Thomas J. Herbert, Jr.
Attorney, Agent, or Firm—Edwin E. Greigg

[57] ABSTRACT

A composite material for recording holograms with infrared radiation. The material includes an IR-absorbent substrate and a thin IR-transparent recording layer. Infrared radiation passes through the recording layer and is absorbed by the substrate whereupon areas of the recording layer are vaporized by contact with heated surface areas of the substrate.

6 Claims, 1 Drawing Figure

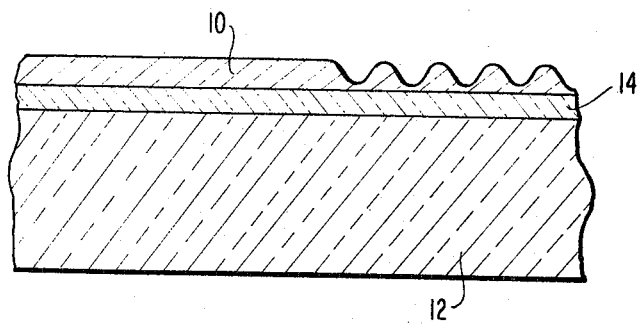

HOLOGRAPHIC RECORDING MATERIAL FOR INFRARED RADIATION

BACKGROUND OF THE INVENTION

The present invention relates to holographic recording, and more particularly to a holographic recording material for use with infrared radiation of a given wavelength, having a surface layer which is vaporizable by the effects of infrared radiation.

The feasibility of storing holograms by vaporization of matter is known. See, for example, the article entitled "Thermally Engraved Gratings using a Giant-Pulse Laser" by Gerritsen and Heller, pages 2054–2056, in Vol. 38, of "Journal of Applied Physics" (April 1967).

It is known to produce holograms in thin bismuth layers by means of ruby laser light of appropriate power and a wavelength of 0.7 $\mu$m. The process is described in the article entitled "Holograms for Thin Bismuth Films" by Amodie and Mezrich appearing on pages 45–46, in Vol. 15, of "Applied Physics letters (July 1969). In process, a spatial resolution of 1000 lines/mm is said to be achievable.

However, when the known bismuth layers are used in the infrared region of the spectrum, the achievable linearity of the recordings is unsatisfactory. Furthermore, the fabrication of thin bismuth layers is complicated.

OBJECTS AND SUMMARY OF THE INVENTION

It is, therefore, an object of the present invention to provide a holographic recording material which permits the production of satisfactory and, especially, of substantially linear holographic recordings even for infrared radiation of relatively long wavelength, for example, of the order of 10 $\mu$m, for which no suitable surface detector is yet known.

According to the invention, this and other objects are achieved by a holographic recording material which is characterized in that the layer which is vaporizable by the effects of infrared radiation is, itself, relatively transparent to that infrared radiation and is disposed on a substrate which absorbs the infrared radiation relatively well. Preferably, the vaporizable layer consists of paraffin wax.

Hence, in the holographic recording material according to the present invention, the absorption of the infrared radiation which is to be recorded and which finally causes the vaporization of the actual recording layer, does not occur, for the most part, in the actual recording layer which consists of paraffin wax and which is practically transparent for the infrared radiation, but rather takes place primarily beneath this layer in the surface region of a substrate on which the vaporizable layer is deposited, or else it occurs in an intermediary layer disposed between the substrate and the vaporizable layer.

The present holographic recording material is distinguished by substantially linear contrast which is very advantageous, especially for multiple exposures. The recording which is produced is a so-called phase hologram.

BRIEF DESCRIPTION OF THE DRAWING

The present invention will be better understood, and further objects and advantages will become more apparent, from the ensuing detailed specification of a preferred, although exemplary, embodiment of the invention taken in conjunction with the sole FIGURE which illustrates in cross section a portion of a holographic recording material as a composite structure including an intermediary layer.

DESCRIPTION OF THE PREFERRED EMBODIMENT

The holographic recording material shown in the FIGURE consists essentially of a vaporizable layer of paraffin wax 10 which is deposited on a substrate 12. According to one embodiment of the invention, an intermediary layer 14 is disposed between the vaporizable layer 10 and the substrate 12.

The vaporizable layer consists of paraffin wax and is preferably relatively thin; its thickness being, for example, approximately 20–500 A.

The substrate 12, on which the evaporizable layer 10 is deposited either can, itself, be highly absorbent of the infrared radiation to be recorded or it can be provided with an intermediary layer 14 which absorbs the infrared radiation relatively well. A glass plate can be used, for example, as the absorbent substrate. The absorbent intermediary layer 14 can, for example, be an IR-absorbent layer.

Using the described recording material, a satisfactory recording of holograms was possible when using an HF-laser (3 $\mu$m) and a $CO_2$-laser (10 $\mu$m) with power densities in the region of a few $MW/cm^2$ and with pulse durations of 300 – 3000 ns.

In contrast to the known bismuth layers, the recording made when using the present recording material is essentially linear even in the infrared region as is depicted in the right hand side of the drawing.

The resolving power of the present recording material is completely sufficient for the recording of infrared holograms.

In place of paraffin wax, other transparent waxes or other materials which perform the same function can be used for the production of phase holograms.

The substrate material 12 and the intermediary layer 14 should be transparent to visible light because, in general, the infrared hologram is reconstructed using visible light and a reconstruction by transmission is substantially more convenient than is one by reflection.

That which is claimed is:

1. A holographic recording assembly for use with infrared radiation comprising, in combination: a surface layer which is relatively transparent to the infrared radiation and is vaporizable by the effects of infrared radiation, and a substrate which is relatively highly absorbent of infrared radiation for receiving the infrared radiation passing through said surface layer, and wherein the surface layer, which is vaporizable by the effects of infrared radiation absorbed by said substrate, is deposited on said substrate; whereby vaporization of the actual recording layer takes place primarily beneath this layer in the vicinity of said substrate on which said surface layer is deposited by virtue of the infrared radiation absorbed by saaid substrate after passing through the surface layers.

2. The recording assembly according to claim 1, wherein the vaporizable layer consists of paraffin wax.

3. The recording assembly according to claim 2, wherein the thickness of the paraffin layer is between 20 and 500 A.

4. The recording assembly according to claim 1, wherein the substrate is a carrier plate consisting of a material which is highly absorbent of infrared radiation.

5. The recording assembly according to claim 4, wherein the carrier plate consists of glass.

6. The recording assembly according to claim 1, wherein the substrate comprises a carrier plate and an intermediary layer which is disposed between said carrier plate and the vaporizable layer and which consists of a material that is highly absorbent of infrared radiation.

* * * * *